United States Patent [19]

Bianchi

[11] Patent Number: 5,162,165
[45] Date of Patent: Nov. 10, 1992

[54] HIGH POWER DENSITY BATTERY FOR PEAK POWER

[75] Inventor: Giuseppe Bianchi, Milan, Italy
[73] Assignee: S.E.R.E. S.r.l., Milan, Italy
[21] Appl. No.: 548,022
[22] Filed: Jul. 5, 1990
[30] Foreign Application Priority Data Jul. 5, 1989 [IT] Italy .................. 21096 A/89

[51] Int. Cl.$^5$ ............ H01M 8/10; H01M 8/12; H01M 6/16
[52] U.S. Cl. ................... 429/30; 429/192; 429/101; 429/26; 429/120
[58] Field of Search ........... 429/26, 30, 101, 120, 429/192

[56] References Cited

U.S. PATENT DOCUMENTS 3,382,105 5/1968 McBryar et al. ............ 429/30
3,418,168 12/1968 Wentworth ................ 429/30
4,826,741 5/1989 Aldhart et al. ............. 429/26

*Primary Examiner*—Anthony McFarlane
*Assistant Examiner*—Nhat Phan
*Attorney, Agent, or Firm*—Bierman and Muserlian

[57] ABSTRACT

Low capacity and high power density electric battery which electrolyzes water in the charging phase to produce hydrogen and oxygen used as reactants in the discharging phase, which battery comprises an ion-exchange membrane, separating two compartments, said compartments containing gas evolving positive and negative electrodes respectively for the evolution of oxygen and hydrogen during the charging phase and for recombination of the same to produce water during the discharging phase, as well as means for the circulation of said water in a spray form.

13 Claims, 2 Drawing Sheets

HIGH POWER DENSITY BATTERY FOR PEAK POWER

BACKGROUND OF THE INVENTION

The present invention concerns a low capacity and high power density battery apt to supply high power output for short periods of time and therefore particularly suitable as a back-up to a steady-output generator, for electric vehicles in the urban traffic.

Electric traction is considered a possible solution to the problems of air and noise pollution. Two lines of development have been pursued so far, the first one resulting in some practical applications in the field of public vehicles (mail and milk distribution, warehouse fork-lifts etc.), provided with an electric battery which is recharged at the end of the day. Presently, lead batteries with a specific energy density of 20-30 Wh/kg ensure a range of operation (an autonomy distance span) of 100/200 km, but weight, even for the so-called "Iron-clad" types, is a serious drawback especially in town traffic where the acceleration necessary to cope with the dynamics of the traffic involves significant power outputs. Many solutions have been tested in an effort to optimize the autonomy-weight-power relationship but without effective results.

Attempts have been made also in the field of light batteries, zinc-air for instance, which even when reaching high energy densities, up to 100 Wh/kg, did not overcome certain technological barriers.

Another line of development, which has been worked out during the middle of the 50's, is based on a fuel cell fed, in the most recent embodiments, with air (positive electrode) and a mixture of $H_2-CO_2$ (negative electrode), such a mixture being obtained from a methanol reformer integrated with the fuel cell.

The recent introduction of fluorinated ion exchange membranes offering a high conductivity (G. A. Eisman—Symposium on Diaphragms, Separators and Ion Exchange Membrane—Electrochemical Society Proceeding Vol. 86-13 page 156) got closer to the target and, at the same time, emphasized the irrationality of combining a generator system made of a fuel cell plus reformer, (rather rigid as it requires operation at steady load) with an application, the electric vehicle, which in the urban traffic needs peak power outputs during the accelerations but for a good part of the remaining time (deceleration, stops, etc.) it requires a modest or even zero power output.

In order to interface the generator system (battery or fuel cell) with the end-use system (electric vehicle), a hybrid system, battery/battery or fuel cell/battery, has been proposed, where a back-up battery is aimed to supply for short periods the peak power outputs required for the acceleration, while a steady-output generator supplies sufficient energy for the normal operating conditions, while recharging the battery during stops and even during the operation with the unexploited exceeding power.

This concept has already been developed combining a membrane fuel cell to a nickel-cadmium battery or, in alternative to a zinc-air battery, as proposed by the Japanese MITI program for a hybrid acid lead-zinc air batteries system. A different solution may be the development of nickel-metal hydrides batteries as recently proposed with interesting but not so satisfactory results to solve the problems of interfacing the generator to the energy requirements of an electric vehicle (H. Ogawa, M. Ikoma, H. Kawano and I. Matsumoto—to Preprint No. 28 of the 16th International Power Source Symposium-1988).

THE INVENTION

It is an object of the present invention to provide for an electric battery directed to supply, for short periods of time, high energy outputs, and therefore suitable to meet the typical peak power requirements of an electric vehicle.

It is a further object of the present invention to provide for a battery with a reduced weight as to be advantageously used on board of vehicles and in general of transport means.

A further object is to provide for a battery which can be advantageously used as a back-up battery in an electricity generating system of an electric vehicle particularly suitable for the town traffic, which system is made of a back-up battery and a steady-output generator, this last one consisting of a battery or fuel cell integrated with a methanol-fed reformer.

The present invention regards a back-up/steady state output generators system apt to drive an electric vehicle for the town traffic involving a peak power absorption (typically 30-200 kW) for some tenths of seconds (typically 30 secs) representing 17% of the total acceleration-cruise-deceleration-stop cycle, an absorption of 25% of the full load for the cruise period lasting some minutes (typically 2 minutes) and representing 66% of the total cycle and almost zero absorption for the deceleration and stop periods for about 30 seconds—one minute representing in the average 17% of the total cycle.

Assuming the steady output generator be working at constant current density, its nominal power Pn referred to the maximum available power (P max) results to be $$Pn = (Pmax \times 17 + 0,25\ Pmax \times 66)/100 = 0,335 \times Pmax$$

hence the power required for the back-up battery, P(b.u.) is:

$$P(b.u.) = 0,665\ Pmax$$

It is clear that the back-up battery allows to reduce to one third of the peak the steady-output generator power (e.g. fuel cell plus reformer).

Moreover, the back-up battery can absorb high current densities also during the charging phase and can recover the deceleration energy.

As regards the components of the system, the present invention refers to an electric battery having low capacity and high current density where, in the charging phase, water is electrolyzed with the production of hydrogen and oxygen stored in the negative and positive pole compartments of the battery, to be used as reactants during the discharging phase.

The battery comprises a polymeric membrane having a proton conductivity, electrocatalyst material embedded on the two sides of the membrane and two compartments, (negative and positive poles) where the electrolysis gases are stored.

As explained before, the battery acts as an electrolyzer in the charging phase involving the following reactions:

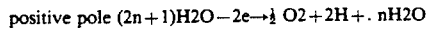
positive pole $(2n+1)H_2O - 2e \rightarrow \frac{1}{2} O_2 + 2H^+ . nH_2O$ negative pole $2H+ \cdot nH2O + 2e \rightarrow H2 + 2nH2O$ In addition the hydrated protons $H+ \cdot nH2O$ migrate in the membrane from the positive pole to the negative one. The hydration, n, is in the order of three to four water molecules for each proton.

At the same time, water back-migrates in the membrane, (from the negative pole to the positive one) so that the net transport of water in the membrane is negligible, provided that the membrane is allowed to keep the correct water, which also ensures the electric conductivity necessary for the hydrated protons migration.

During the discharging phase where the preceding reactions take place in the opposite way, according to the following scheme:

positive pole $\frac{1}{2} O2 + 2H+ \cdot nH2O + 2e \rightarrow (2n+1) H2O$ negative pole $H2 + 2nH2O - 2e \rightarrow 2H+ \cdot n H2O$ hydrated protons migrate from the negative pole to the positive one and water molecules backdiffuse in the opposite direction.

In the electrochemical systems with a solid polymeric electrolyte and SPE(R) gas electrodes, that is electrodes in form of catalytic powder bound to both faces of the membrane, so that no liquid electrolyte is needed, problems arise for the water management directed to supply and to remove reaction water in the positive and negative poles compartments and to assure the correct hydration of the ionic polymeric membrane. This can be obtained keeping the membrane in contact with a gas where the partial pressure of water is slightly over or below, according to the necessities, to the water vapor pressure of the ionic membrane, at the various temperatures.

The present invention will be better illustrated in the following detailed description. It is however evident that different embodiments are possible without departing from the scope of the present invention.

BRIEF DESCRIPTION OF THE DRAWINGS

Referring to the drawings.

DETAILED DESCRIPTION OF THE INVENTION

Figure 1:
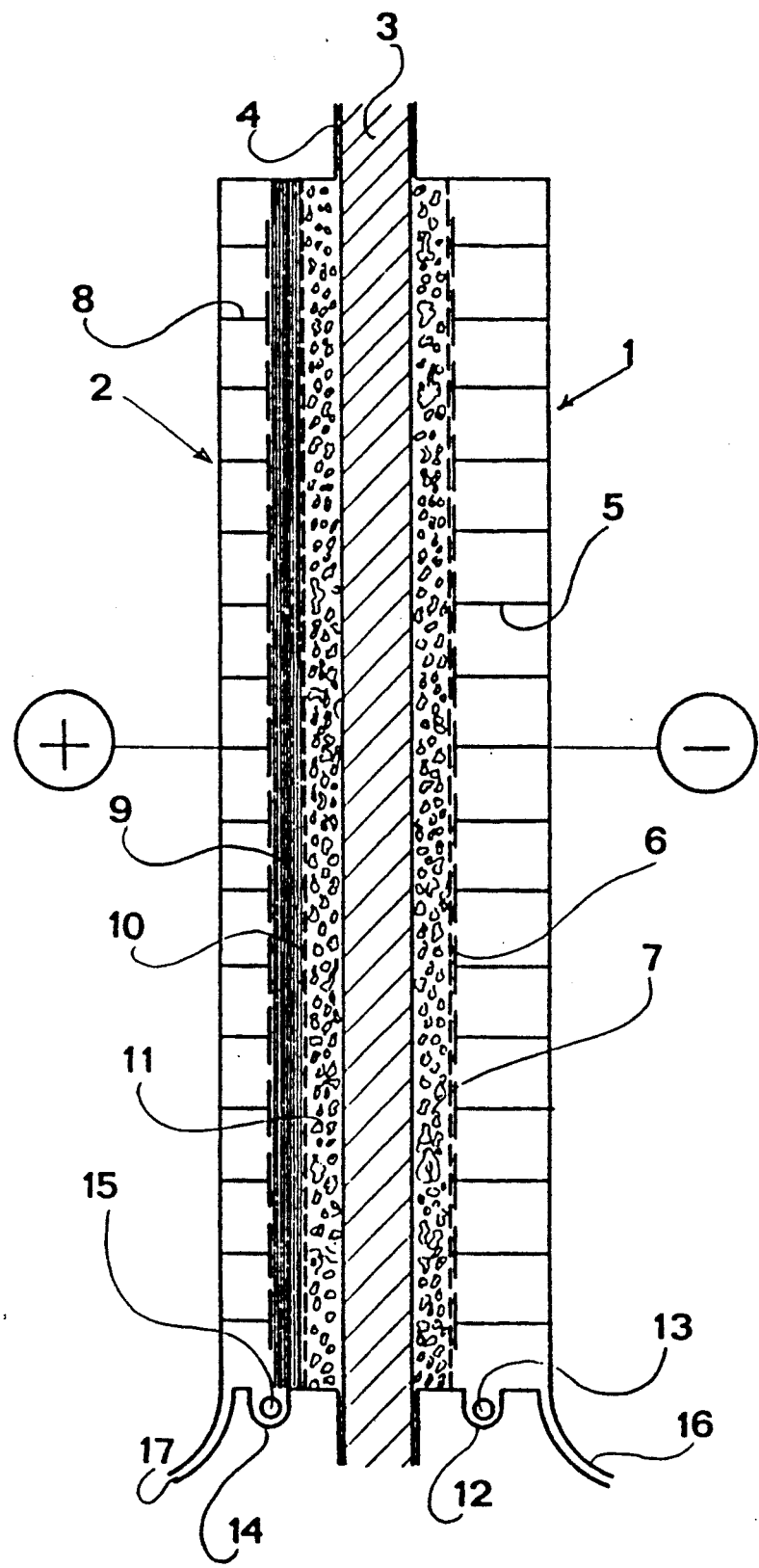
FIG. 1 is a cross-section of a single element of a membrane hydrogen-air battery.

FIG. 1 illustrates an embodiment of the present invention comprising a single element of a membrane hydrogen oxygen battery, wherein two rigid end plates 1 and 2 equipped with external cooling fins (not shown in figure) are separated by a polymeric ion-exchange membrane 3 sealed by flanges 4 to form a negative pole compartment comprising a rigid structure 5 supporting a small opening mesh 6 which presses against the membrane a thin layer of electrocatalytic material 7 and a positive pole compartment having half the volume of the negative pole anodic compartment and comprising a rigid structure 8 on which a resilient mattress 9 is positioned and presses, by means of a small-opening mesh 10, the thin layer of electrocatalytic material 11 against the membrane and the membrane itself against the rigid structure of the negative pole compartment. The rigid structure 8, the metallic mattress 9, the mesh 10 provide for electric current flow between the electrode material 11 and the end plate 2 which is used for the electrical connection within the stack of elements which form the battery.

If the battery has to store gas up to reach high pressures at full charge, the whole battery can be inserted in a metal or fiberglass-reinforced plastic pipe, and the empty space between the battery and the pipe is filled with a dielectric liquid which assures the electric insulation among the various elements, the balancing of the inside/outside pressures and the elimination of the heat dispersed through the cooling fins on end plates 1 and 2.

In the resilient metallic mattress 9 hydrophilic fibers or the like are interwoven. During the charging step, the hydrophilic fibers absorb water which is present as a spray in the gas phase and allow an easier supply of the reaction water $(H2O - 2e \rightarrow \frac{1}{2} O2 + 2H+)$ to the electrocatalytic material 11. During the discharging step, the fibers absorbed by capillarity the reaction water $(\frac{1}{2} O2 + 2H+ + 2e \rightarrow H2O)$ formed on the surface of the electrocatalytic material 11 and make the drain easier towards the bottom of end plate 2 preventing flooding of electrocatalytic material 11. On the bottom of end plate 1 a groove 12 is provided which contains deionized water used to humidify the hydrogen gas by means of a high frequency sprayer 13. On the bottom of end-plate 2, a groove 14 is also provided, which contains the reaction water necessary for the charging step: a high frequency sprayer 15 directs the small water droplets upwards to be absorbed by the hydroscopic fibres interwoven in mattress 9 during the charging step. The same groove 14 collects the water formed during the discharging step and stores it for the next charging step. Two pipes 16 and 17 placed on the bottom of 1 and, respectively, 2 have a double purpose. The first one is to effect the first water load in 12 and, respectively, 14. The other one is to eliminate the air contained in 1 and 2 at the moment of the first charging step, in order to avoid dilution of hydrogen and oxygen with the atmospheric nitrogen.

For an energy production corresponding to 20 kW/m2 supplied for a period of 5 minutes to the pressure, at full charge, of 10(7) Pa, the negative pole compartment should have a 9 liter volume useful for storing hydrogen with a corresponding 4–5 liter volume useful for storing of oxygen in the positive pole compartment. The total volume of the battery results to be 40 liters with a weight of 100 Kg including fittings and piping for pressure operation. This leads to a 17 Wh/kg energy density, to 25 Ah/kg capacity and 0,2 kW/kg power density. At each charge and discharge 702 g of water are consumed or released into the positive pole compartment.

Besides a high frequency sprayer, the spraying of water in the negative pole and, above all, in the positive pole compartments can be carried out with an airless nozzle which sprays pressurized water coming from outside the battery through a piping system not shown in FIG. 1. The water, collected in channels 12 and 14, is removed by means of pies 16 and 17.

Preferably a high frequency sprayer is used to humidify hydrogen of the negative pole compartment and a spraying nozzle with pressurized water to supply the positive pole compartment with.

Figure 2:
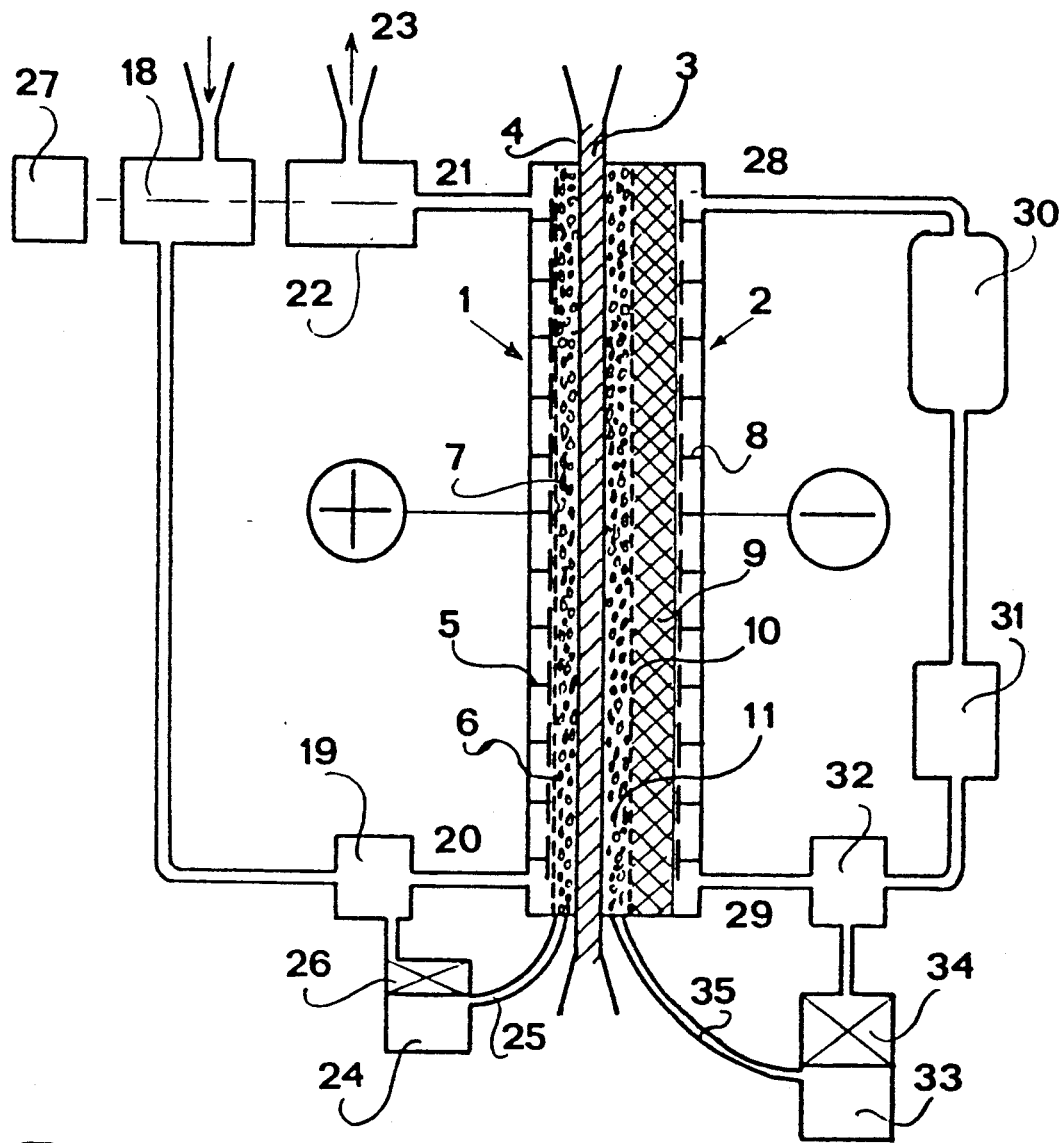
FIG. 2 is a schematic view of the steady output generator plus reformer.

FIG. 2 shows a different embodiment of the present invention particularly suitable when the steady-state output generator is an air-hydrogen fuel cell working at 80°–90° C. and integrated with a reformer. Hydrogen is stored outside the battery, whereas oxygen is wasted to the atmosphere and the battery operates with air, like the fuel cell to which it is coupled.

The battery has the same structure of the battery in FIG. 1 (numerals from 1 to 17). The positive pole compartment is connected to the air compressor 18. The compressed air is fed to the sprayer 19, enters into the positive pole compartment through 20, leaves such compartment from 21, and after expansion in 22, is vented in the atmosphere through 23. In the discharging step with water formation in the positive pole compartment, the dry and hot air, supplied by compressor 18, evaporates the reaction water, driving it away through 22 and 23. During the charging step the sprayer 19 is fed with water from the tank 24 which drains, by means of 25, the bottom of 1. A dosing pump 26 feeds to 19 the quantity of water to be sprayed according to the operating conditions the battery is run. The compressor and the turbine, driven by the electric engine 27, are coaxially connected in order to allow the recovery of the compression energy.

In the positive pole compartment, end-plate 2 is provided with openings 28 and 29 for the inlet and outlet of the hydrogen stored in tank 30 and kept in circulation by means of pump 31. Sprayer 32 receives water from the tank 33 through the dosing pump 34. Pipe 35 drains the water which is collected in the bottom of the positive pole compartment and is conveyed into tank 33.

Whenever the back-up battery is combined with a steady-state output fuel cell operating with air and hydrogen, the air circuits of the battery and of the fuel cell may be common and both the battery and the fuel cell are kept at the same temperature. The steady state output fuel cell comprises similar devices as under the back-up battery for the humidification of the gas flows by spraying of water, as well as common compressor and the air turbine, high frequency generator for the sprayer and pump of the pressure water.

The electric interfacing between the steady-state output battery and the back-up battery can be carried out by dividing the back-up battery into sections to be series or parallel connected during the charging and discharging. If the electric vehicle is equipped with AC motors, the interfacing can be done using the same inverter which feeds AC energy to the motor.

I claim:

1. In a low capacity and high power density hydrogen-oxygen electric battery acting as a water electrolyzer during the charging phase which comprises at least one elementary cell formed by two end-plates (1, 2) and separated by an ion-exchange membrane (3) into a positive pole compartment and a negative pole compartment, a positive electrode (11) in contact with one side of said membrane (3) and a negative electrode (7) in contact with the other side of said membrane (3), means for supplying water to and discharging water from said compartments, means for supplying oxygen to the positive compartment and for supplying hydrogen to the negative compartment and means for discharging oxygen and hydrogen from said compartments, the improvement comprising the positive pole compartment having about half the volume of the negative pole compartment.

2. The battery of claim 1 characterized in that the positive pole and negative pole compartments are able to withstand a pressure up to 10 exp7 Pa.

3. The battery of claim 1 characterized in that said battery is contained in a pressure-resistant vessel, the space between said battery and the walls of said vessel being filled with dielectric fluid.

4. The battery of claim 1 characterized in that each electrode (7, 11) is a thin layer of powdered electrocatalytic material.

5. The battery of claim 4 characterized in that the electrodes (7, 11) are bonded to or embedded into the membrane (3).

6. The battery of claim 1 characterized in that the electrodes (7, 11) are pressed against the membrane (3) by supporting means.

7. The battery of claim 6 characterized in that the supporting means supporting the negative electrode (7) is a rigid structure (5) carrying a small-opening mesh (6) and the supporting means supporting the positive electrodes (11) is a rigid structure (8) carrying a resilient mat (9).

8. The battery of claim 7 characterized in that the resilient mat (9) comprises a hydrophilic material.

9. The battery of claim 1 characterized in that said negative pole compartment comprises external vessels.

10. The battery of claim 1 characterized in that said compartments are provided with grooves (12, 14) directed to collect the reaction water and with pipes to eliminate air and to load the reaction water during the first charging step.

11. The battery of claim 10 characterized in that said grooves are provided with spraying means (13, 15).

12. The battery of claim 1 characterized in that said positive pole and negative pole compartments have a volume of 9 and 4 to 5 liters respectively for an energy production of 20 kW per square meter of said membrane for a period of 5 minutes.

13. Electric generator system for driving an electrically powdered vehicle comprising the battery of claim 1 and a steady-state output generator.

* * * * *